(12) United States Patent
Chidambaram et al.

(10) Patent No.: US 9,981,246 B2
(45) Date of Patent: May 29, 2018

(54) CATALYST ADDITIVE COMPOSITION FOR CATALYTIC CRACKING AND A PROCESS OF PREPARATION THEREOF

(71) Applicant: Indian Oil Corporation Limited, Bandra, Mumbai (IN)

(72) Inventors: Velusamy Chidambaram, Haryana (IN); Mohan Prabhu Kuvettu, Haryana (IN); Arumugam Velayutham Karthikeyani, Haryana (IN); Biswanath Sarkar, Haryana (IN); Balaiah Swamy, Haryana (IN); Shiba Prasad Choudhury, Haryana (IN); Ram Mohan Thakur, Haryana (IN); Brijesh Kumar Verma, Haryana (IN); Brijesh Kumar, Haryana (IN); Biswapriya Das, Haryana (IN)

(73) Assignee: INDIAN OIL CORPORATION LIMITED, Bandra (East) (IN)

( * ) Notice: Subject to any disclaimer, the term of this patent is extended or adjusted under 35 U.S.C. 154(b) by 7 days.

(21) Appl. No.: 14/837,879

(22) Filed: Aug. 27, 2015

(65) Prior Publication Data
US 2016/0059213 A1 Mar. 3, 2016

(30) Foreign Application Priority Data
Aug. 27, 2014 (IN) .......................... 2748/MUM/2014

(51) Int. Cl.
*B01J 21/16* (2006.01)
*C10G 11/04* (2006.01)
(Continued)

(52) U.S. Cl.
CPC ........... *B01J 21/16* (2013.01); *B01J 35/0026* (2013.01); *B01J 35/109* (2013.01);
(Continued)

(58) Field of Classification Search
CPC .... B01J 35/0026; B01J 35/1019; B01J 37/08; B01J 21/12; C10L 2270/023;
(Continued)

(56) References Cited

U.S. PATENT DOCUMENTS 3,758,403 A 9/1973 Rosinski et al.
3,867,308 A 2/1975 Elliott, Jr.
(Continued)

FOREIGN PATENT DOCUMENTS

WO WO2013005225 1/2013

OTHER PUBLICATIONS

Gorte, R.J. (1999). Catalysis Letters, 62, 1-13.*
Hensen, E.J.M. et al. (2010). Journal of Physical Chemistry C, 114, 8363-8374.*
White, J.L. et al. (2008). Thermoplastic and Rubber Compounds-Technology and Physical Chemistry, Hanser, 301 pgs [Office action cites pp. 40 & 53-54].*
Ciullo, P.A. (1996). Industrial Minerals and Their Uses, William Andrew, 647 pgs [Office action cites p. 63].*

*Primary Examiner* — Brian A McCaig
(74) *Attorney, Agent, or Firm* — Workman Nydegger

(57) ABSTRACT

The present invention relates to a catalyst additive composition suitable for fluid cracking, riser cracking and fixed bed cracking with reduction in bottom and coke, wherein the aluminosilicate and silica-alumina is generated in situ from added clay and silica. The present invention is also directed towards the preparation of the said catalyst additive composition. The invention also discloses a process for cracking of heavy hydrocarbons using the said catalyst additive.

8 Claims, 1 Drawing Sheet

Pore Size distribution of Additive under Example-2 as per present invention

(51) Int. Cl.
  *B01J 35/10* (2006.01)
  *B01J 37/00* (2006.01)
  *B01J 35/00* (2006.01)
  *C10G 11/05* (2006.01)
  *C10L 1/06* (2006.01)
  *B01J 38/12* (2006.01)

(52) U.S. Cl.
  CPC ....... *B01J 35/1019* (2013.01); *B01J 35/1038* (2013.01); *B01J 35/1057* (2013.01); *B01J 35/1061* (2013.01); *B01J 35/1066* (2013.01); *B01J 37/0045* (2013.01); *C10G 11/04* (2013.01); *C10G 11/05* (2013.01); *C10L 1/06* (2013.01); *B01J 38/12* (2013.01); *B01J 2229/64* (2013.01); *C10G 2300/107* (2013.01); *C10G 2300/1077* (2013.01); *C10G 2400/02* (2013.01); *C10L 2270/023* (2013.01)

(58) Field of Classification Search
  CPC ...... C10G 2300/107; C10G 2300/1077; C10G 2400/02
  See application file for complete search history.

(56) References Cited

U.S. PATENT DOCUMENTS

| | | |
|---|---|---|
| 3,957,689 A | 5/1976 | Ostermaier et al. |
| 4,312,744 A | 1/1982 | Tu et al. |
| 4,326,993 A | 4/1982 | Chester et al. |
| 4,333,857 A | 6/1982 | Lim et al. |
| 4,880,787 A | 11/1989 | Bundens et al. |
| 4,956,075 A | 9/1990 | Angevine et al. |
| 4,980,053 A | 12/1990 | Li et al. |
| 4,987,110 A | 1/1991 | Scherzer |
| 5,286,369 A | 2/1994 | Roberie et al. |
| 5,389,232 A | 2/1995 | Adewuyi et al. |
| 5,846,402 A | 12/1998 | Mandal et al. |
| 5,958,818 A | 9/1999 | Demmel et al. |
| 6,114,267 A | 9/2000 | Ghosh et al. |
| 6,258,257 B1 | 6/2001 | Swan, III et al. |
| 8,137,534 B2 | 3/2012 | Upson et al. |
| 2001/0044372 A1 | 11/2001 | Vaughan et al. |

\* cited by examiner

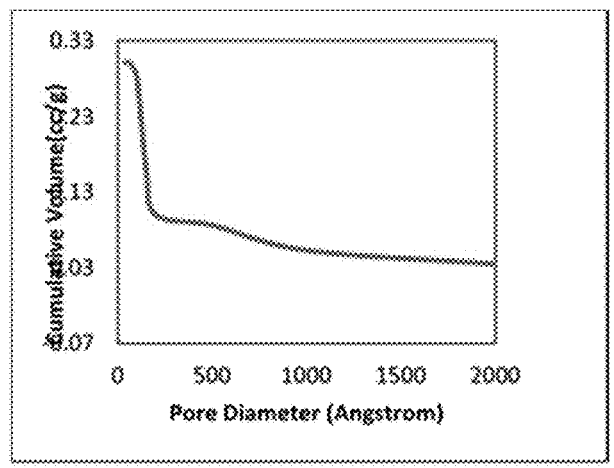
Pore Size distribution of Additive under Example-2 as per present invention

CATALYST ADDITIVE COMPOSITION FOR CATALYTIC CRACKING AND A PROCESS OF PREPARATION THEREOF

FIELD OF THE INVENTION

The present invention relates to a catalyst additive composition suitable for fluid cracking, riser cracking and fixed bed cracking with reduction in bottom and coke, wherein the aluminosilicate and silica-alumina is generated in situ from added clay and silica. The present invention is also directed towards the preparation of the said catalyst additive composition. The invention also discloses a process for cracking of heavy hydrocarbons using the said catalyst additive.

BACKGROUND OF THE INVENTION

A cracking catalyst composition for enhancing olefins during cracking of heavier hydrocarbons and gasoline, comprising FCC catalyst, in-situ modified clay based additive, optionally ZSM-5 additive. The catalyst can be present in the form of microspheres, pellet, tablet, extrudate and ring and suitable for enhancing olefin product yield by cracking heavy feed material derived from atmospheric and vacuum distillation bottoms; FCC bottoms, coker bottoms and hydrocracker bottoms.

Fluid Catalytic Cracking (FCC) technology developed as early as Second World War is one of the most sophisticated and flexible processes and is most preferred today. Catalyst employed in FCC process possess high conversion, selectivity towards gasoline, low coke make, superior thermal and hydrothermal stability due to the usage of faujasite zeolite based derivatives such as NH4Y, HY, USY, REY and REUSY. This zeolite, on account of its unique pore architecture and cages allow several types of reactions such as cracking, cyclization, alkylation, isomerization among intermediate cracked products as well as with different type of hydrocarbon molecules present in the feed and produces desired useful products as well as adequate amount of coke which is exploited for delivering desired heat for sustaining endothermic cracking reactions. This coke make and catalyst deactivation is accelerated while processing heavier feeds containing metals such as vanadium, nickel, iron and higher aromaticity. However, for maintaining good trade between endothermic catalytic cracking and exothermic coke burning, there needs to be balanced catalyst composition which can boost the economy of FCC process. Besides maintaining adequate coke, there are other issues in FCC process. The Faujasite zeolite, which is the key component of FCC catalyst, is based on collection of sodalite cages connected to each other through their 6-member faces. This arrangement of cages create 12 member pore opening having pore diameter about 13.5 Å. Further, the sodalite cages themselves have maximum pore opening of about 6.5 Å. Thus with this type of pore size distribution, and high acidity of main zeolite component, FCC catalyst can maximize gasoline, diesel and produce little amount of liquefied petroleum gas (LPG) owing to product selectivity. This limitation can be overcome to a large extent by employing ZSM-5 zeolite based additive. Similarly, for overcoming limitation in cracking of bulky poly aromatic hydrocarbons, naphthenes and paraffin molecules present in heavy feed, a special type of additives based on large pore matrix and phosphate are used nowadays. It may be noted, in spite of employing combination of FCC catalyst with the additives, FCC process still suffers from few limitations in producing high value propylene, isobutylene beyond certain limit, and suppress low cost coke, dry gas and DCO. Thus there is a need to develop new additive catalyst and use this product with a balanced combination of other additives in main FCC catalyst to maximize high value product such as gasoline, propylene and LPG with reduction of coke.

Use of silica sol based binder system in the preparation of zeolite promoted catalysts is cited in U.S. Pat. No. 3,867,308 and alum buffered silica-sol is described in U.S. Pat. No. 3,957,689 and these compositions are for maximizing distillates. Binding of low soda Y zeolite with gel alumina and polysilicate has been described in U.S. Pat. Nos. 4,333,857 and 4,326,993.

U.S. Pat. No. 4,987,110 refers to the preparation of attrition resistant FCC catalysts using low soda silica sol, REUSY and aluminum chlorohydrol. Product selectivity of faujasite zeolite (also referred as Y zeolite) based catalysts is restricted to gasoline range molecules, due to the presence of uniform size large pores in the range 6.5 Å and 13.5 Å. For enhancing $C_3$ to $C_4$ selectivity, for the first time ZSM-5 zeolites having pores in the range 5.4 to 5.5 Å, were employed along with faujasite zeolites, in a conventional silica-alumina based binder system and process for this is described in U.S. Pat. No. 3,758,403.

U.S. Pat. No. 6,258,257 refers to a process for producing polypropylene from $C_{\text{sub}}3$ olefins by a two-stage fluid catalytic cracking process having two types of catalysts made from zeolites of large pore and medium pore. U.S. Pat. No. 5,286,369 describes a phosphate based binder composition suitable for binding high silica zeolites. U.S. Pat. No. 5,958,818, refers to a Zeolite/clay/phosphate catalyst characterized by their high levels of zeolite stability.

U.S. Pat. No. 4,956,075 describes a catalyst composition containing Mn, a large pore crystalline molecular sieve, and optionally rare earths for catalytic cracking. This catalyst claimed to offer high gasoline selectivity with low coke yields. U.S. Pat. No. 4,880,787 refers to a catalyst compositions of superior hydrothermal stability, capable of increasing gasoline plus distillate, improved coke selectivity and reduced $C_4$ gas yields, are based on framework dealuminated faujasitic zeolite and matrix treated with aluminum and rare earth. US Pat application 20010044372 A1 refers to a coke selective catalyst comprising a crystalline molecular sieve material having a metal deficient framework wherein the residual framework aluminum sites constitute less than 20% of the total T-sites.

U.S. Pat. No. 4,312,744 refers to a process for low coke make cracking catalyst prepared by mixing a zeolitic crystalline aluminosilicate dispersed in a porous carrier material with a solution of rare earth salt, separating a filter cake from the slurry by a means not involving the washing of the filter cake and calcining the filter cake.

U.S. Pat. No. 8,137,534 B2 refers to catalyst systems for use in these processes that decrease yields of undesirable byproducts including dry gas (hydrogen, methane, ethane, and ethylene) and coke. Representative catalyst compositions comprise a highly siliceous zeolite such as silicalite.

WO 2013005225 A1, refers to a process for cracking of higher boiling petroleum feedstock to obtain lower dry gas without affecting the yield of LPG, light olefins and gasoline products; said process comprising, a FCC catalyst component and an additive component, wherein a novel alkaline earth metal varying from 0.01 wt % to 2 wt % has been used along with conventional catalyst components.

U.S. Pat. No. 6,114,267 refers to a process for preparation of fluidized catalytic cracking (FCC) catalyst, comprising silicon stabilized large crystallite sized synthetic faujasite zeolite, aluminum depleted and normal kaolin clay, alumina and silica. The cracking catalyst is highly active and selective for bottom up gradation, it produces less coke and higher gasoline and total cycle oil (TCO) and possesses improved metal tolerance. This catalyst has limitation in producing LPG, rich in propylene beyond certain limit.

U.S. Pat. No. 5,846,402 refers to a process for selective catalytic cracking of a petroleum-based feedstock to produce a product having a high yield of liquefied petroleum gas (LPG) and light olefins having 3 to 4 carbons, the process comprises of employing a solid acidic catalyst comprising ultra-stable Y-zeolite, Pentasil zeolite active material, bottom selective matrix and rare earth.

U.S. Pat. No. 5,389,232 discloses a riser cracking process where 3 wt. % ZSM-5 additive on the catalyst (ZSM-5 is a shape selective high silica zeolite of average 5.4 Angstrom pore opening) was used to increase the yield of $C_3/C_4$ olefins by 7 wt. % of feed with minimum loss of gasoline yield up to 5 wt. % of feed from base value. However, in this process the major objective was to improve propylene/iso-butylene selectivity, keeping the gasoline yield at maximum. As a result, the maximum LPG yield in this process is only up to 18 wt. % of feed stock.

U.S. Pat. No. 4,980,053 describes a deep catalytic cracking (DCC) process at very low weight hourly space velocity (WHSV) of 0.2-20 hr.$^{-1}$ and relatively higher Catalyst/Oil ratio of 2-12 as compared to conventional FCC conditions of 100-300 hr.$^{-1}$ WHSV and 4-8 catalyst to oil ratio. The LPG yield is reported to be in the range of 30-45 wt. % using paraffinic gas oil as feed stock. However, the major drawback of this process is its relatively very high yield of dry gas (6-12 wt. %) and coke (4-9 wt. %) even with paraffinic gas oil as feed stock. Moreover, the process with a very unstable by-product gasoline cut of sizeable quantity (20-35%) requiring further downstream treatment.

From various prior art catalyst compositions, it can be inferred that no single catalyst component can give desired performance and only combination of catalysts can deliver. In spite, the combined catalyst too have limitations in delivering desired high value olefinic product and suppressing undesired coke, DCO beyond certain limit.

SUMMARY OF THE INVENTION

The present invention discloses a catalyst additive composition suitable for fluid catalytic cracking process in which high value olefins can be significantly enhanced. The present invention also discloses a process of preparation of the said catalyst additive and its composition for enhancing the production of LPG, propylene, high value gasoline, and reduction of undesired coke in Fluid Catalytic Cracking Unit (FCCU).

Accordingly, the present invention provides a catalyst additive composition comprising 10-40 wt % of calcined clay, 10-40 wt % of diluent clay, 10-30 wt % of silica, 1-30 wt % of alumina, less than 0.3 wt % sodium with a surface area of 140 to 165 m²/g, average pore diameter of 80 to 86 Å, apparent bulk density (ABD) of 0.7 to 1 g/cc, an attrition index below 10 and has a pore volume in the range of 0.2 to 0.4 cc/gm. and acidity of 0.158 to 0.168 mmol/g.

In an embodiment of the present invention, the aluminosilicate is generated in situ from alumina and silica.

In an embodiment of the present invention, 10 to 40% of pore volume of the additive is contributed by pores in the range of 10-100 Å and 10 to 40% of pore volume is contributed by pores in the range of 100 to 2000 Å.

In an embodiment of the present invention, the source of reacted clay and diluent clay is selected from kaolinite, bentonite, illite, vermiculite, smectite, montmorillonite, sepiolite and hectorite.

In an embodiment of the present invention, the silica is selected from ammonia or sodium stabilized colloidal silica having less than 0.3 wt % residual soda, sodium silicate and tetraethyl orthosilicate.

In an embodiment of the present invention, the alumina is selected from alumina trihydrate, bohemite, pseudoboehmite, alumina sol and alumina gel.

In an embodiment of the present invention, the present invention provides a process for preparing the catalyst additive, said process comprising:
(a) calcining clay at a temperature in the range of 500° C.-1000° C.;
(b) diluting an acid with water and adding the calcined clay of step (a) to obtain a mixture;
(c) adding diluted sodium silicate solution with the mixture of step (b);
(d) adding a diluent clay having LOI (Loss On Ignition) in the range of 13 wt % to 16 wt % to obtain a slurry;
(e) spray drying the slurry of step (d) to obtain the catalyst additive composition.

In an embodiment of the present invention, the concentration of acid used in the formulation is in the range of 5-20 wt %.

In an embodiment of the present invention, the acid is selected from sulfuric acid, hydrochloric acid, nitric acid, formic acid and acetic acid.

In an embodiment of the present invention, ratio of the acid and water ranges from 1 to 2.

11. The process as claimed in claim 7, wherein the amount of diluent clay added in the process ranges from 10 to 40 wt %.

In an embodiment of the present invention, the aluminosilicate is generated in situ, employing 10-40 wt % of calcined clay, 10-40 wt % of diluent clay, 10-30 wt % of silica, and 1-30 wt % of alumina.

In an embodiment of the present invention, the present invention provides a process for catalytic cracking with the catalyst additive, wherein the process is comprising contacting a feed with the catalyst additive under reaction temperature of 510-540° C. and feed sourced from atmospheric and vacuum distillation bottoms; FCC bottoms, coker bottoms and hydrocracker bottoms, to obtain LPG up to 27%, gasoline in the range of 35-37%, reduction in coke in the range of 2-5 wt %, and bottoms below 5 wt %.

In an embodiment of the present invention, the present invention provides a process for catalytic cracking with the catalyst additive, wherein the process is performed under reaction temperature of 540-580° C. and feed sourced from resid, the said catalyst additive produces LPG up to 32%, gasoline in the range of 23-25% and reduction in coke between 2-5 wt %.

BRIEF DESCRIPTION OF DRAWING

FIG. 1: Pore Size distribution of Additive under Example-2 as per present invention.

DESCRIPTION OF THE INVENTION

The present invention discloses a catalyst additive composition suitable for fluid cracking, riser cracking and fixed bed cracking in which high value olefins can be significantly enhanced. The present invention also discloses a process of preparation of the said catalyst additive composition and a process employing the said catalyst additive for enhancing the production of LPG, Propylene, gasoline, diesel and reduction of undesired coke and bottom.

An aspect of the present invention discloses a process for preparing a catalyst additive characterized in that the silica-alumina and aluminosilicate matrix required for cracking of residue and heavy hydrocarbons are generated in-situ rather than adding externally in the process. This process alter the acid sites in the range of 0.158 to 0.168 mmol/g and generates the defects/porosity in the cracking components which in turn enhance yield of desired products such as gasoline, olefin and reduces coke and bottom.

In an embodiment of the present invention, a catalyst additive composition is disclosed comprising, 10-40 wt % of reacted clay, 10-40 wt % of diluent clay, 10-30 wt % of silica, 1-30 wt % of alumina, less than 0.3 wt % sodium. In another embodiment of the present invention, a catalyst additive composition is disclosed comprising, 10-40 wt % of reacted clay, 10-40 wt % of diluent clay, 10-30 wt % of silica, 1-30 wt % of alumina, less than 0.3 wt % sodium wherein the aluminosilicate is generated in situ from alumina and silica.

In accordance with the present invention, the prepared catalyst additive has surface area of 140 to 165 m$^2$/g, average pore diameter of 80 to 86 Å, acidity of 0.158 to 0.168 (mmol/g) apparent bulk density (ABD) of 0.7 to 1 g/cc, an attrition index below 10 and has a pore volume in the range of 0.2 to 0.4 cc/gm. Also, in accordance with the present invention, a catalyst additive suitable for fluid cracking, riser cracking and fixed bed cracking is disclosed wherein 10 to 40% of pore volume of the catalyst additive is contributed by pores in the range of 10-100 Å and 10 to 40% of pore volume is contributed by pores in the range of 100 to 2000 Å.

In accordance with the present invention, the source of reacted clay and diluent clay is selected from kaolinite, bentonite, illite, vermiculite, smectite, montmorillonite, sepiolite and hectorite. Further in accordance with the present invention, the silica is selected from ammonia or sodium stabilized colloidal silica having less than 0.3 wt % residual soda, sodium silicate and tetraethyl orthosilicate. The alumina used in accordance with the present invention is selected from alumina trihydrate, bohemite, pseudoboehmite, alumina sol and alumina gel.

A process for preparing the catalyst additive suitable for fluid cracking, riser cracking and fixed bed cracking is disclosed, said process comprising calcining clay at 500-1000° C., optionally modifying the reacted clay with acid and adding dilute acid to the reacted clay. The reacted clay-acid mixture is cooled, and sodium silicate, diluent clay and optionally alumina are added to the reacted clay acid mixture. The mixture is then dried to obtain the catalyst additive.

In an embodiment of the invention, process for preparing the catalyst additive suitable for Fluidized Catalytic Cracking process is disclosed wherein the aluminosilicate is generated in situ, employing 10-40 wt % of reacted clay, 10-40 wt % of diluent clay, 10-30 wt % of silica, and 1-30 wt % of alumina.

In yet another aspect of the present invention, a process for cracking of heavy hydrocarbons using prepared catalyst additive is disclosed with steps comprising, contacting a feed with the catalyst additive under reaction temperature of 510-540° C. and feed sourced from atmospheric and vacuum distillation bottoms; FCC bottoms, coker bottoms and hydrocracker bottoms, catalyst additive produces LPG up to 27 wt %, gasoline in the range of 35-37 wt %, reduction in coke in the range of 2-5 wt %, and bottoms below 5 wt %.

In an embodiment of the present invention, a process for cracking of heavy hydrocarbons using prepared catalyst additive is disclosed wherein under reaction temperature of 540-580° C. and feed sourced from resid, the said catalyst additive produces LPG up to 32 wt %, gasoline in the range of 23-25 wt % and reduction in coke between 2-5 wt %.

Having described the basic aspects of the present invention, the following non-limiting examples illustrate specific embodiment thereof.

EXAMPLES

Feed Stocks:

The feed stocks used in the present invention are the residual fractions having metals (Ni+V) less than 40 ppm. Table-1 gives the properties of feed stock used in this invention.

TABLE 1

Properties of Feed Cases-1 & 2

| Sr. No. | Attributes | Unit | Feed-1 | Feed-2 |
|---|---|---|---|---|
| 1 | Density @ 15° C. | g/cc | 0.887 | 0.928 |
| 2 | Kinematic Viscosity @ 100° C. | Cst | 7.4 | — |
| 3 | Distillation, D-1160 | | | |
| 4 | IBP | ° C. | 162 | — |
| 5 | 5% | ° C. | 267 | — |
| 6 | 30% | ° C. | 370 | — |
| 7 | 50% | ° C. | 409 | — |
| 8 | 70% | ° C. | 457 | — |
| 9 | Sulphur | wt % | 1.72 | — |
| 10 | Total N$_2$ | ppm | 860 | — |
| 11 | CCR | wt % | 3.3 | 3.0 |
| 12 | V | ppm | 23 | <1 |
| 13 | Ni | ppm | 9 | <1 |
| 14 | Na | ppm | 1.8 | <1 |
| 15 | Fe | ppm | 2.4 | <1 |
| 16 | Paraffin | Wt % | — | 46.8 |
| 17 | Naphthene | Wt % | — | 21.6 |
| 18 | Aromatics | Wt % | — | 31.6 |

Example 1 a. This example describes the process for the preparation of ready to react clay. 588 gm kaolin clay with 85% particles size below 3 micron, volatiles in the range of 13-18 wt % was calcined to 500-1000° C. for one hour and cooled to room temperature.

b. Clay prepared as per the procedure mentioned in Example-1(a) was modified with acid like sulfuric acid, hydrochloric acid, nitric acid, formic acid and acetic acid at 50-100° C. for 3-5 hours.

Example 2

Preparation of Cracking Catalyst Additive with Enhanced Olefin, Gasoline with Reduced Coke and Bottom This example describes the process for the preparation of catalyst additive microspheres. 707 gm of neutral grade sodium silicate was dilutes with 707 gm of chilled DM (4° C.). 333 gm of sulfuric acid (30%) was diluted with 333 gm of DM water and maintained at 95° C. and vigorous stirring, while to this, 450 gm of clay prepared as per the procedure mentioned in Example-1(a). Calcined clay-acid mixture was cooled to 18° C., and to this 1380 gm of dilute sodium silicate solution was added at the 50-100 gm/minute through an immersed air atomization spray nozzle under vigorous stirring between 1000-3000 rpm. During the process of addition of silicate, 352 gm diluent clay having LOI of 15 wt % was also added. Final slurry having pH of 3 was spray dried in a counter current spray dryer at inlet temperature of 375° C. and outlet temperature of 12° C. Spray dried product was sieved to +20, −120 micron for further processed. 500 gm of spray dried product was dispersed in hot DM water, recovered by filtration reslurried twice with hot DM water, filtered and cake was oven dried to obtained as ready to use catalyst additive suitable for enhancing yield of olefins, enhanced gasoline and reduction in bottoms. Catalyst additive product has ABD of 0.78 gm/cc, attrition index of 5. The pore volume 0.32 cc/gm comprising 10-40% volume contributed by pores in the range 10-100 Å and 10-40% volume contributed by pores in the range 100-2000 Å.

TABLE 2

Properties of Additive in example-2.

| S. No | Additive in example-2 | Properties |
|---|---|---|
| 1 | SA (m²/g) | 165 m²/g |
| 2 | Average pore dia by BET (Å) | 86 |
| 3 | Pore volume (cc/g) | 0.32 |
| 4 | Acidity (mmol/g) | 0.168 |

Example 3

This example describes the process for the preparation of catalyst additive microspheres employing sodium stabilized colloidal silica. 333 gm of sulfuric acid (30%) was diluted with 333 gm of DM water and maintained at 95° C. and vigorous stirring, while to this, 450 g clay prepared as per the procedure mentioned in Example-1(a) is said as calcined clay-acid mixture was cooled to 18° C., and to this 833 gm of sodium stabilized colloidal silica was added at the 50-100 gm/minute through a immersed air atomization spray nozzle under vigorous stirring between 1000-3000 rpm. During the process of addition of silicate, 352 gm diluent clay having LOI of 15 wt % was also added. Final slurry having pH of 3 was spray dried in a counter current spray dryer at inlet temperature of 375° C. and outlet temperature of 12° C. Spray dried product was sieved to +20, −120 micron for further processed. 500 gm of spray dried product was dispersed in hot DM water, recovered by filtration reslurried twice with hot DM water, filtered and cake was oven dried to obtained as ready to use catalyst additive suitable for enhancing yield of olefins, enhanced gasoline and reduction in bottoms. Catalyst additive product has ABD of 0.65 gm/cc, attrition index of 10.

Example 4

This example describes the process for the preparation of catalyst additive microspheres employing Ammonium stabilized colloidal silica. 333 gm of sulfuric acid (30%) was diluted with 333 gm of DM water and maintained at 95° C. and vigorous stirring, while to this, 450 gm clay prepared as per the procedure mentioned in Example-1(a) was added and maintained for 3 hours. Calcined clay-acid mixture was cooled to 18° C., and to this 833 gm of ammonium stabilized colloidal silica was added at the 50-100 gm/minute through an immersed air atomization spray nozzle under vigorous stirring between 1000-3000 rpm. During the process of addition of silicate, 352 gm diluent clay having LOI of 15 wt % was also added. Final slurry having pH of 3 was spray dried in a counter current spray dryer at inlet temperature of 375° C. and outlet temperature of 12° C. Spray dried product was sieved to +20, −120 micron for further processed. 500 gm of spray dried product was calcined at 550° C. to obtained as ready to use catalyst additive suitable for enhancing yield of olefins, enhanced gasoline and reduction in bottoms. Catalyst additive product has ABD of 0.71 gm/cc, attrition index of 10.

From the Examples 2-4, in-situ modification of clay in presence of silica followed by forming microsphere with diluent clay found to be suitable product with the required Physico-chemical properties and the catalyst additive prepared based on example-2 capable of enhancing propylene rich LPG, gasoline & diesel and to reduce coke and bottom. Therefore procedure described in example-2 employed for preparation of the catalyst additive in following examples.

Example 5

This example describes the process for the preparation of catalyst additive microspheres. 707 gm of neutral grade sodium silicate was dilutes with 707 gm of chilled DM (4° C.). 333 gm of sulfuric acid (30%) was diluted with 333 gm of DM water and maintained at 95° C. and vigorous stirring, while to this, 450 gm of clay calcined at 950° C. and reacted with an acid was added and maintained for 3 hours. Reacted clay-acid mixture was cooled to 18° C., and to this 1380 gm of dilute sodium silicate solution was added at the 50-100 gm/minute through an immersed air atomization spray nozzle under vigorous stirring between 1000-3000 rpm. During the process of addition of silicate, 176 gm diluent clay having LOI of 15 wt % and 180 g bohemite alumina having LOI 17 wt % were also added. Final slurry having pH of 3 was spray dried in a counter current spray dryer at inlet temperature of 375° C. and outlet temperature of 12° C. Spray dried product was sieved to +20, −120 micron for further processed. 500 gm of spray dried product was dispersed in hot DM water, recovered by filtration reslurried twice with hot DM water, filtered and cake was oven dried to obtained as ready to use catalyst additive suitable for enhancing yield of olefins, enhanced gasoline and reduction in bottoms. Catalyst additive product has ABD of 0.70 gm/cc, attrition index of 7.

Example 6

This example describes the process for the preparation of catalyst additive microspheres. 707 gm of neutral grade sodium silicate was dilutes with 707 gm of chilled DM (4° C.). 333 gm of sulfuric acid (30%) was diluted with 333 gm of DM water and maintained at 95° C. and vigorous stirring, while to this, 450 gm of clay reacted at 950° C. was added and maintained for 3 hours. Reacted clay-acid mixture was cooled to 18° C., and to this 1380 gm of dilute sodium silicate solution was added at the 50-100 gm/minute through an immersed air atomization spray nozzle under vigorous stirring between 1000-3000 rpm. During the process of addition of silicate, 176 gm diluent clay having LOI of 15 wt % and 202 gm Aluminum trihydrate alumina having LOI 26 wt % were also added. Final slurry having pH of 3 was spray dried in a counter current spray dryer at inlet temperature of 375° C. and outlet temperature of 12° C. Spray dried product was sieved to +20, −120 micron for further processed. 500 gm of spray dried product was dispersed in hot DM water, recovered by filtration reslurried twice with hot DM water, filtered and cake was oven dried to obtained as ready to use catalyst additive suitable for enhancing yield of olefins, enhanced gasoline and reduction in bottoms. Catalyst additive product has ABD of 0.67 gm/cc, attrition index of 7.

Example 7

This example describes the process for the preparation of catalyst additive microspheres with pre-modified clay. 707 gm of neutral grade sodium silicate was dilutes with 707 gm of chilled DM (4° C.). 333 gm of sulfuric acid (30%) was diluted with 333 gm of DM water and maintained at 95° C. and vigorous stirring, while to this, 450 gm of clay prepared as per the procedure mentioned in Example-1(b) 1380 gm of dilute sodium silicate solution was added at the 50-100 gm/minute through a immersed air atomization spray nozzle under vigorous stirring between 1000-3000 rpm. During the process of addition of silicate, 352 gm diluent clay having LOI of 15 wt % was also added. Final slurry having pH of 3 was spray dried in a counter current spray dryer at inlet temperature of 375° C. and outlet temperature of 12° C. Spray dried product was sieved to +20, −120 micron for further processed. 500 gm of spray dried product was dispersed in hot DM water, recovered by filtration reslurried twice with hot DM water, filtered and cake was oven dried to obtained as ready to use catalyst additive suitable for enhancing yield of olefins, enhanced gasoline and reduction in bottoms. Catalyst additive product has ABD of 0.67 gm/cc, attrition index of 7.

TABLE 3

Performance evaluation with Feed Case-2

| | Catalyst | | | | |
|---|---|---|---|---|---|
| | Catalyst-G + commercial additive | Catalyst-G + Additive of Example-5 | Catalyst-G + Additive of Example-6 | Catalyst-G + Additive of Example-7 | *Catalyst-G + Additive of Example-2 (Additive prepared as per present invention) |
| Cat/oil | | | 5.0 | | |
| Reaction Temperature | | | 545° C. | | |
| Dry gas | 6.60 | 7.11 | 7.16 | 7.14 | 5.8 |
| LPG | 25.11 | 25.22 | 25.4 | 25.61 | 26.14 |
| Gasoline (C5-150C) | 26.02 | 23.73 | 24.65 | 24.31 | 27.34 |
| Naphtha | 6.78 | 6.97 | 6.61 | 6.74 | 6.59 |
| LCO | 15.47 | 15.74 | 15.33 | 15.57 | 16.07 |
| DCO | 8.68 | 9.02 | 9.01 | 8.72 | 8.72 |
| Coke | 11.34 | 12.21 | 11.84 | 11.91 | 9.34 |
| 216 Conversion | 75.85 | 75.24 | 75.66 | 75.71 | 75.21 |

Table-3 indicates that the performance of catalyst composition (Catalyst-G+Additive of Example-2) prepared as per present invention is better than other catalyst composition w.r.to LPG & Gasoline yields and reduces low value products yields like dry gas and coke.

Table 3A shows performance of Catalyst-I+Additive of Example-2 in comparison with Catalyst-I+Commercial additive is shown. LPG and Gasoline increase by 1 wt % in case of Catalyst-I+Additive of Example-2 compared to Catalyst-I+Commercial additive.

TABLE 3A

Performance evaluation with Feed Case-2:

| | Catalyst | |
|---|---|---|
| | Catalyst-I + commercial additive (Additive-H) | Catalyst-I + Additive of Example-2 |
| Cat/oil | 5.0 | |
| Reaction Temperature | 545° C. | |
| Dry gas | 7.0 | 6.9 |
| LPG | 23.89 | 25 |
| Gasoline | 25.11 | 26.06 |
| Naphtha | 7.25 | 6.85 |
| LCO | 15.8 | 15.47 |
| DCO | 9.02 | 9.12 |
| Coke | 12 | 10.61 |
| 216 Conversion | 75.38 | 75.42 |

Table-3A indicates that the performance of catalyst composition Catalyst-I+Additive of Example-2 prepared as per present invention is better than other catalyst composition w.r.to LPG & Gasoline yields and reduces low value coke yield.

Example 8

This example describe the performance of cracking catalyst additive component whose preparation is described in example 2 at 5 wt % level with FCC catalyst. The prepared catalysts were impregnated with 6852 ppm vanadium employing vanadium naphthanate, 2200 ppm of nickel employing nickel naphthanate by Mitchell method, followed by hydrogen reduction and hydrothermal deactivation at 788° C. for 3 hours. The performance evaluation was carried out with the process parameters of table 4 in ACER+MAT unit at 510° C. employing feed case-1. The results are shown in Table.4 along with the commercial cracking Catalyst-B.

TABLE 4 process parameters for performance evaluation

| S. No. | Parameters | Value |
|---|---|---|
| 1 | Cat/oil ratio in example 8 | 4.5 |
| 2 | Reaction Temperature in example 8 | 510° C. |
| 3 | Cat/oil ratio in example 9 | 5.0 |
| 4 | Reaction Temperature in example 9 | 545° C. |

In the fluid catalytic cracking process (FCC), the catalyst/catalyst along with additive is being continuously undergone reaction and regeneration step. The feed being processed in FCCU contains more contaminant metals (Ni & V) & Conradson Carbon Residue (CCR) and it will lead to a significantly higher metal level on the catalyst. i. e. >3000 ppm (Ni+V) & coke on the catalyst. During reaction in the reactor, coke along with metal (Ni & V) is deposited on the catalyst which leads to de-activation of the catalyst. This catalyst is then activated in the regenerator by burning the coke and leaving the metals on the catalyst. This catalyst is called as the equilibrium catalyst (E-cat). Therefore, lab deactivation procedures need to be designed to simulate these changes that occur commercially. An appropriate E-cat sample of the same fresh catalyst should be used to design the lab deactivation conditions, which include duration of steam aging, steam partial pressure, metal (Ni & V) and temperature. Therefore, laboratory deactivation protocols have been mainly developed by taking the properties of E-cat as a reference.

Therefore the conversions of fresh catalysts/catalyst along with additives in to equilibrium catalysts/catalyst along with additives are carried out by metal impregnation followed by hydrothermal deactivation.

TABLE 5

Performance evaluation with Feed Case-1

| | Catalyst | | |
|---|---|---|---|
| | Base FCC catalyst-B | FCC catalyst-B + Additive of example 2 Feed | Delta value at conversion at |
| | Feed Case-1 | Feed Case-1 | 82.46 wt % |
| Reaction Temperature ° C. | 510 | 510 | |
| Cat/Oil ratio | 4.5 | 4.5 | |
| Dry gas | 2.51 | 2.00 | −0.51 |
| LPG | 24.29 | 26.66 | 2.37 |
| Propylene in LPG | 30 | 32 | 2.00 |
| Isobutylene | 2.30 | 2.48 | 0.18 |
| Gasoline | 37.59 | 37.55 | −0.04 |
| Naphtha | 10.44 | 10.42 | −0.02 |
| LCO | 14.14 | 14.78 | 0.64 |
| DCO | 3.4 | 2.76 | −0.64 |
| Coke | 7.63 | 5.83 | −1.80 |
| 216 Conversion | 82.46 | 82.46 | |

Table-5 indicates that the performance of catalyst composition (FCC catalyst-B+Additive of example 2) prepared as per present invention is better than the base FCC catalyst w.r.to LPG, Propylene, diesel yields and reduces low value products like coke & dry gas yields.

Example 9

This example describes the performance of cracking catalyst composition comprises catalyst A, B, C, D & E. The details descriptions of the catalysts/additives are given in table-6. However performances of the catalyst compositions are given in table-7.

TABLE 6

Detailed description of the catalysts/additives

| Sr. No. | Catalyst Name | Details description of catalyst |
|---|---|---|
| 1 | Catalyst A | Catalyst prepared in the present invention under Example-2 |
| 2 | Catalyst C | Commercial ZSM-5 additive prepared under U.S. Pat. No. 7,656,475 |
| 3 | Catalyst D | Commercial FCC catalyst |
| 4 | Catalyst E | Commercial additive described in Demel Patent WO97/12011 |

All these catalyst components are de-activated hydro thermally and its activity was evaluated in fixed bed Auto MAT unit under reaction temperature at 545° C. after preparing their composite mixture. The performance results of the composite catalyst are given in Table 7.

TABLE 7

Performance evaluation with Feed Case-2

| | Catalyst | | |
|---|---|---|---|
| | (E) + (C) + (D) | (A) + (C) + (D) (Catalyst composition as per present invention) | Delta value |
| Feed | Feed-2 | Feed-2 | |
| Reaction temperature ° C. | | | |
| Severity, W/F, Min. | 1.03 | 1.02 | |
| Dry gas | 8.16 | 7.37 | −0.79 |
| LPG | 29.77 | 31.39 | +1.62 |
| propylene | 9.03 | 10.41 | +1.38 |
| Propylene in LPG | 30.33 | 33.16 | |
| Isobutylene | 1.56 | 1.76 | |
| Gasoline | 23.91 | 25.23 | +1.32 |
| Naphtha | 6.1 | 6.02 | |
| LCO | 10.93 | 10.33 | |
| DCO | 4.08 | 5.01 | |
| Coke | 17.05 | 14.65 | −2.40 |
| 216 Conversion | 84.99 | 84.66 | 0.33 |

Table-7 indicates that the performance of catalyst composition [(A)+(C)+(D)] prepared as per present invention is better than the commercial catalyst composition [(E)+(C)+(D)] w.r.to LPG, Propylene, gasoline yields and reduces low value products like coke & dry gas yields.

We claim:

1. A catalyst additive composition comprising 10-40 wt % of calcined clay, 10-40 wt % of diluent clay, 10-30 wt % of silica, 1-30 wt % of alumina, and less than 0.3 wt % sodium, wherein the catalyst additive has a surface area of 140 to 165 m$^2$/g, average pore diameter of 80 to 86 A, apparent bulk density (ABD) of 0.7 to 1 g/cc, an attrition index below 10 and has a pore volume in the range of 0.2 to 0.4 cc/gm, wherein the calcined and diluent clays are selected from kaolinite, illite, vermiculite, smectite, and sepiolite.

2. The catalyst additive as claimed in claim 1, wherein an aluminosilicate is generated in situ from the alumina and silica.

3. The catalyst additive as claimed in claim 1, wherein 10 to 40% of volume of the additive is contributed by pores in the range of 10-100 Å and 10 to 40% of volume is contributed by pores in the range of 100 to 2000 Å.

4. The catalyst additive as claimed in claim 1, wherein the smectite is bentonite.

5. The catalyst additive as claimed in claim 1, wherein the silica is selected from ammonia or sodium stabilized colloidal silica having less than 0.3 wt % residual soda, sodium silicate and tetraethyl orthosilicate.

6. The catalyst additive as claimed in claim 1, wherein the alumina is selected from alumina trihydrate, bohemite, pseudoboehmite, alumina sol and alumina gel.

7. A process for catalytic cracking with the catalyst additive of claim 1, wherein the process comprises contacting a feed with the catalyst as claimed in claim 1 under reaction temperature of 510-540° C. and feed sourced from atmospheric and vacuum distillation bottoms; FCC bottoms, coker bottoms and hydrocracker bottoms, to obtain LPG up to 27%, gasoline in the range of 35-37%, reduction in coke in the range of 2-5 wt %, and bottoms below 5 wt %.

8. A process for catalytic cracking with the catalyst additive of claim 1, wherein the process comprises catalytically cracking a feed sourced from resid under a reaction temperature of 540-580° C., the said catalyst additive produces LPG up to 32%, gasoline in the range of 23-25% and reduction in coke between 2-5 wt %.

\* \* \* \* \*